(12) United States Patent
Van Sprang (10) Patent No.: US 10,259,090 B2
(45) Date of Patent: Apr. 16, 2019

(54) MACHINE TOOL UNIT WITH A TOOL CLAMPING DEVICE

(71) Applicant: FRANZ KESSLER GMBH, Bad Buchau (DE)

(72) Inventor: Joachim Van Sprang, Ravensburg (DE)

(73) Assignee: Franz Kessler GmbH, Bad Buchau (DE)

( * ) Notice: Subject to any disclaimer, the term of this patent is extended or adjusted under 35 U.S.C. 154(b) by 0 days.

(21) Appl. No.: 15/866,750

(22) Filed: Jan. 10, 2018

(65) Prior Publication Data

US 2018/0126508 A1 May 10, 2018

Related U.S. Application Data

(63) Continuation of application No. PCT/EP2016/066741, filed on Jul. 14, 2016.

(30) Foreign Application Priority Data

Jul. 14, 2015 (DE) .......................... 10 2015 111 419

(51) Int. Cl.
*B23Q 17/00* (2006.01)

(52) U.S. Cl.
CPC ......... *B23Q 17/005* (2013.01); *B23Q 17/003* (2013.01); *B23B 2260/128* (2013.01)

(58) Field of Classification Search
CPC ................ B23Q 17/005; B23Q 17/003; B23Q 2260/128; B23B 2260/128

(Continued)

(56) References Cited

U.S. PATENT DOCUMENTS 4,704,056 A 11/1987 Babel
5,730,562 A 3/1998 Matsumoto et al.
(Continued)

FOREIGN PATENT DOCUMENTS

DE     35 29 181 A1    2/1987
DE    196 36 701 A1    3/1997
(Continued)

OTHER PUBLICATIONS

International Search Report and Written Opinion (Application No. PCT/EP2016/066741) dated Oct. 10, 2016.

(Continued)

*Primary Examiner* — Max H Noori
(74) *Attorney, Agent, or Firm* — Burr & Brown, PLLC (57) ABSTRACT

A motor-driven machine-tool unit such as a multi-axis turning head or a motor spindle, having a stator unit and at least one rotor unit that is rotatable about a rotation axis, wherein the rotor unit comprises at least one tool receptacle unit having a tool clamping device that is adjustable in a longitudinal direction of the rotation axis and impingeable with a clamping force, for fixing and bracing a releasably fixable tool, wherein comparatively high requirements are met, in particular, in terms of the accuracy of the machining and/or the reliability in the machining. According to the present invention, this is achieved above all in that at least two clamping force sensors are provided for detecting the bracing of the tool clamping device, in particular the clamping force that is caused in the fixing and bracing.

13 Claims, 3 Drawing Sheets

(58) Field of Classification Search
USPC .................................................. 73/862.381
See application file for complete search history.

(56) References Cited

U.S. PATENT DOCUMENTS

| | | | |
|---|---|---|---|
| 2005/0044992 A1* | 3/2005 | Williford | B25B 25/005 |
| | | | 81/9.3 |
| 2009/0072502 A1 | 3/2009 | Weller et al. | |
| 2016/0236290 A1* | 8/2016 | Behringer | B23Q 3/066 |
| 2017/0106522 A1* | 4/2017 | Coates | H02K 11/33 |
| 2017/0128769 A1* | 5/2017 | Long | G06Q 20/102 |
| 2017/0349307 A1* | 12/2017 | Seelos | B25B 25/005 |

FOREIGN PATENT DOCUMENTS

| | | |
|---|---|---|
| DE | 196 30 205 A1 | 1/1998 |
| DE | 101 44 643 A1 | 6/2003 |
| EP | 2 272 627 A1 | 1/2011 |
| WO | 2007/104438 A1 | 9/2007 |

OTHER PUBLICATIONS

English translation of International Preliminary Report on Patentability (Chapter I) (Application No. PCT/EP2016/066741) dated Jan. 16, 2018, 7 pages.

* cited by examiner

MACHINE TOOL UNIT WITH A TOOL CLAMPING DEVICE

CROSS REFERENCE TO RELATED APPLICATIONS

This application is a continuation of International Application No. PCT/EP2016/066741 filed Jul. 14, 2016, which designated the United States, and claims the benefit under 35 USC § 119(a)-(d) of German Application No. 10 2015 111 419.4 filed Jul. 14, 2015, the entireties of which are incorporated herein by reference.

FIELD OF THE INVENTION

The present invention relates to a machine-tool unit having a tool clamping device and to a method.

BACKGROUND OF THE INVENTION

In the case of machine tools, there are various replaceable devices or tools, respectively, which are connected to the machine tool by way of standardized interfaces. These herein are predominantly tools which are connected to the machine tool spindle or the motor spindle, respectively, by way of a releasable conical connection, and in which so-called collet chucks are opened or closed, respectively, by way of an axial movement such that the axial force that is required for reliably fastening the tool can be transmitted to the tool, or can later be released again, respectively. The so-called collet chuck, or the clamping elements thereof, respectively, by virtue of the axial adjustment thereof push against a detent/ring, or the spindle shaft, respectively, and on account thereof are braced, or form a counter bearing in relation to the clamping force in order for the tool to be braced.

The function of the collet chuck requires the highest possible accuracy, that is to say that the individual clamping segments have to be produced very precisely and optionally also finished. A collet chuck usually has six clamping segments which are disposed radially about the rotation axis.

Clamping systems of this type for machine tools are known, for example from DE 196 36 701 A1 or DE 35 29 181 A1.

In operation it can readily arise by virtue of the "rough" and "dirty" conditions in machine tools that small shavings or abraded particles, respectively, or the like are lodged with the coolant in the clamping system or between individual clamping segments and the shaft, respectively, leading to a positional modification of the respective clamping element. This leads to inaccuracies in terms of the ideal or nominal position, respectively, of the tool and thus to inaccuracies in the machining of the workpiece. However, these inaccuracies of potentially a few micrometers are often no longer tolerable nowadays and lead to scrap and thus to economic damage.

In some cases, malfunctions and/or impediments of the clamping system or of the individual clamping segments, respectively, can also arise during the operation, that is to say during the subtractive machining using the clamped tool, the malfunctions and/or impediments likewise leading to inaccuracies in the machining of the workpiece. However, these inaccuracies are also no longer tolerable nowadays and lead to scrap and thus to economic damage. In the case of a breakage of a clamping segment fragments can even be hurled away, potentially leading to heavy damage to the machine tool and even to a significant risk for people or to personal injury, respectively.

Moreover, a machine tool is already known from DE 196 30 205 A1, wherein the machining accuracy is to be improved by a machine-independent coordinate system. An optical measuring system that is very complex in terms of construction and cost is installed herein on the machining carriage(s), the optical measuring system by means of inter alia a light beam that is directed onto a fixedly installed receiver and of various evaluation components is intended to detect and as far as possible correct errors in terms of direction, dynamic deformations on account of process forces, etc. This complex optical measuring system is moreover suitable only for specific machine tools, in particular, having main and transverse carriages.

SUMMARY OF THE INVENTION

It is an object of the present invention to propose a machine-tool unit having a tool clamping device and a method, respectively, wherein high requirements are met without any comparatively high complexity, in particular, in terms of the accuracy of machining and/or of reliability in the machining.

Accordingly a machine-tool unit according to the present invention is distinguished in that at least two clamping force sensors are provided for detecting the bracing of the tool clamping device, in particular of the clamping force that is caused in the fixing and bracing; in that the at least two clamping force sensors are configured as proximity sensors for detecting a spacing between the rotor unit and the stator unit, in particular for measuring the clamping force across a deformation of at least part of the rotor unit that runs symmetrically about the rotation axis and is caused by the action of the clamping force, wherein the at least two clamping force sensors are configured as deformation sensors for detecting a deformation of at least part of the rotor unit that is generated by the clamping force, wherein the at least two clamping force sensors are disposed at mutually dissimilar angular positions about the rotation axis and/or are disposed symmetrically about the rotation axis, in order for the position and/or the alignment of the rotation axis to be determined in a machining procedure of the machine tool.

Accordingly, an indirect detection of the effective clamping forces and moreover of the exact actual position of the rotor unit is achieved according to the present invention by the modification of the spacing between the rotor unit and the stator unit. As opposed to DE 196 30 205 A1, no machine-tool independent, external, complex, optical measuring system is used herein, but rather the machine-tool unit, for example, the motor spindle or the turntable, comprises the two advantageous clamping force sensors which inter alia in terms of construction and cost is significantly less complex and permits the detection according to the present invention directly on/in the rotor unit both prior to/after as well as during the machining of the workpiece and/or the rotation of the rotor unit.

Specifically, the invention in an innovative manner utilizes the concept that the accuracy of the machining procedure in all operation modes or operation phases, respectively, is not inevitably determined by the nominal or resting position, respectively, of the rotation axis of the rotor unit and by the machining point/location of the machining tool, for example of the milling cutter, of the drill bit, etc., on the workpiece that results therefrom, but rather by the actual position or the modification of the position/alignment of the rotation axis, that is to say by the comparison of the nominal and actual values at the point in time of the current/real individual operation, or by the actual operating conditions, respectively. This means that the actual operation or the actual position/alignment of the rotation axis is determined by means of the present invention or of the at least two clamping force sensors, respectively, and can be used in an advantageous manner for improving the machining accuracy in almost all individual operating situations, for example, prior to and/or during contact between the tool and the workpiece, during machining at dissimilar revolutions, feeding rates, workpiece material properties/resistances, degrees of tool wear, cooling/lubricating conditions, thermal expansions, impediments or breakages of the collet chuck or of the clamping elements, respectively, or generally any wear on the tool clamping system or any modifications thereto, such as on or to the spring collars, the pull rod or the like, contaminations during fixing/clamping of the tool, etc.

A gradual loss in clamping force of the so-called spring collar pack that arises over a comparatively long temporal period, in particular over months/years, can even, for example, be detected here by way of the two sensors according to the present invention and be used inter alia for signaling maintenance work or a replacement, respectively. In this case, a largely uniform loss in all collet chuck elements and the deformation of the rotor unit or of the tool receptacle unit that is associated herewith becomes detectable, and this actual situation can be compared with the nominal situation already prior to machining, that is to say whether the minimum clamping force, or the minimum deformation, respectively, of each clamping element of the collet chuck is present or undershot. For example, if an excessively small deformation or an excessively large spacing according to the present invention, respectively, is established herein, this can be signaled in an advantageous manner, for example, and a reference to the clamping system requiring checking/maintenance/repairing can be made.

These internal gradual changes/deteriorations to the clamping system that become effective over a comparatively long time cannot be identified by a machine-independent coordinate system according the DE 196 30 205 A1, and such a machine-independent coordinate system can thus also not initiate any remedy.

By contrast, according to the present invention not only orderly chucking of the tool prior to the machining procedure, but also a defect, or any damage or wear, respectively, within the entire clamping system, such as to or on a clamping element of the collet chuck for example, can be detected during machining of the workpiece and optionally be compensated for by adapting or readjusting, respectively, in particular the feeding path or the like, or machining can be interrupted or terminated.

Also, the forces that are generated by the feed, the revolutions of the tool, or by machining, respectively, and that act on the clamping system or the rotor unit/tool receptacle unit, respectively, can be detected by way of the two clamping force sensors and be used for advantageous regulating or controlling, respectively, signaling and/or readjusting/adapting of the machine procedure. For example, if comparatively high forces act on the rotor unit or the tool receptacle unit, respectively, on account of a comparatively high feeding rate the actual position/actual alignment of the rotation axis of the rotor unit is modified in relation to the resting/nominal position or alignment, respectively, wherein inter alia the rotor unit or the tool receptacle unit, respectively, is deformed, leading to a modification of the spacing between the rotor unit and the stator unit that is detectable according to the present invention.

On account of the advantageous angular positioning of the two clamping force sensors according to the present invention, not only the position of the rotation axis but also the value and moreover advantageously also the direction/alignment of the actual forces/stresses that act on the rotor unit or the tool receptacle unit, respectively, can be detected/determined and/or a conclusion pertaining thereto can be drawn prior to or during the operation/machining procedure.

The clamping force sensor is thus configured as a sensor that operates in a non-contacting manner, or as a proximity sensor, respectively, for detecting the spacing between the rotor unit and the stator unit. The material deformation that is caused by the bracing can inter alia be detected therewith in an advantageous manner, since an air gap, or the spacing, respectively, between the rotor unit and the stator unit is modified, that is to say decreased or enlarged, by said material deformation. According to the present invention, this modification in the spacing can be used for detecting indirectly a correct/orderly bracing of the tool clamping device, or the bracing of the tool, respectively. An abrasion or wear of respective (contacting or rubbing) elements is thus effectively prevented, enabling a long service life.

An advantageous electronic and/or electrical control unit, in particular having stored values/correlations of/between deformations/spacings/modifications of spacings according to the invention, and optionally of machining forces/effective forces that are causal thereto or the like is preferably provided.

In principle, a correct or orderly, respectively, bracing or fixing, respectively, of the tool can be implemented with the aid of the detection of the bracing according to the present invention, in particular of a or even of each clamping element or clamping segment, for example of a collet chuck that is configured as a tool clamping device. For example, if the detected actual bracing or actual fixing, respectively, of the tool prior to and/or during the operation or machining, respectively, deviates from a (predefined/ideal/correct) nominal bracing or nominal fixing, respectively, of the tool, a signal can be generated by means of an advantageous control unit, for example, and/or a stoppage of the machining can be performed/generated.

Requirements which are generally decisively higher, in particular, in terms of the accuracy of machining and/or of the reliability in machining can be met according to the present invention.

According to the present invention, the clamping force sensor is configured as a deformation sensor for detecting a deformation of at least part of the rotor unit and/or of the tool receptacle unit that is generated by the clamping force. The tool clamping device or collet chuck, respectively, under the influence of force performs an axial movement. This clamping force generates a significant material stress which arises, in particular, on each clamping segment and thus also on each detent of the clamping segment or in a comparatively punctiform manner on the rotor unit or the spindle shaft, respectively. Material deformations which are detected by way of the clamping force sensor according to the present invention and, for example, can be used further or processed, respectively, by means of an advantageous electronic control unit are generated on account of the significant material stress.

According to the present invention, (very minor) material deformations are generated by the bracing of the tool, or by the activation the tool clamping device/collet chuck, respectively, the deformations being, in particular, a few micrometers, by way of which the bracing of the tool is detected according to the present invention, and is advantageously used further or evaluated, respectively, and preferably enabling regulating/controlling of the machining, in particular, during the operation or the subtractive machining, respectively. Entirely novel possibilities for monitoring the machining procedure and thus a decisively higher accuracy and reliability in machining can be implemented therewith.

A tool clamping device when viewed in the circumferential direction of the rotation axis is advantageously configured so as to be symmetrical or rotationally symmetrical, respectively. It has been demonstrated in complex and accurate tests or computations, respectively, that, for example, in the case of a use of a so-called collet chuck having, for example, six individual clamping segments that are disposed (symmetrically) in the circumferential direction, very minor but symmetrical or rotationally symmetrical, respectively, material deformation of the shaft/spindle shaft, or of a detent element and/or of a detent ring element, respectively, is generated by the bracing of the tool.

The material deformation, or material deformations, respectively, (in the case of a tool that is clamped in a correct/orderly manner), in particular, in the case of a tool having a hollow-shaft cone (HSC) advantageously represents/represent in an advantageous manner the nominal state in the context of the present invention that can be detected or monitored, respectively, by means of the two clamping force sensors according to the present invention. Each (even so minor) deviation, or deviations, respectively, of this nominal state, or of the material deformations of part of the rotor unit or of the tool receptacle unit, respectively, that are configured/present symmetrically about the rotation axis can be detected. These key indicators represent the actual state in the context of the present invention, both in the resting state as well as during the operation or during machining, respectively. This current actual state, or the modifications of the nominal deformation/nominal deformations can be appraised/evaluated in an advantageous manner, in particular, by means of an electronic and/or electrical control unit. Compensation measures, or a readjustment, respectively, modifications of the feeding path, of the feeding direction, of the revolutions, or the like, can optionally be initiated/performed as long as, for example, a modification of the position/alignment of the rotation axis is established in the actual state. This enhances the accuracy of the machining procedure, or improves the dimensional accuracy of the machined workpiece to a decisive extent.

At least two neighboring clamping force sensors preferably have a mutual angular position of 90°, and/or the rotation axis is disposed in the at least two detection regions of the at least two clamping force sensors. The position or tilting, respectively, of the rotation axis can be determined/detected in an advantageous manner herewith.

The clamping force sensor when viewed in the direction of the rotation axis is preferably disposed beside, or so as to be level in height with, respectively, or in the region of the tool clamping device/collet chuck/clamping segments, respectively, and/or of the tool receptacle unit, and, in particular, when viewed in the radial direction preferably disposed outside the tool clamping device/collet chuck/clamping segments and/or the tool receptacle unit, or on a radius larger than the tool clamping device/collet chuck/clamping segments, and/or tool receptacle unit, respectively. The material deformations of the counter bearing/detent, or of the spindle shaft, respectively, or of the tool receptacle unit, respectively, can be detected in an advantageous manner herewith.

For example, the clamping force sensor is disposed on an/or in the rotor unit, and comprises a transmission unit for transmitting measured data. The clamping force sensor herein can detect directly or immediately, respectively, the deformation of the tool clamping device/collet chuck/clamping segments and/or of the tool receptacle unit, or of the counter bearing/detent (of the clamping element/clamping elements), respectively, or of the spindle shaft, respectively. The advantageous transmission unit enables a transmission of the sensor signal, or of the measured data, respectively, to the stator unit and, on account thereof, in an advantageous manner to an advantageous control unit for regulating/controlling the machine tool and/or machine tool component/motor spindle.

The transmission unit can be embodied as a rotary feedthrough, for example. The transmission unit is preferably configured as a transmitter/receiver unit, or as a radio frequency unit for transmitting the measured data/sensor signals in a contactless or wireless manner, respectively.

The transmission unit is advantageously configured as an electrical data and/or power transmission unit for transmitting electrical power between the stator unit and the rotor unit. The electrical power transmission unit preferably has at least two coils that are operatively connected. The measured data, or the sensor signals, respectively, and/or the respective electrical power pulse/signals can be transmitted from the rotating part to the static part of the machine tool component herewith.

For example, an optional third clamping force sensor can be configured as a strain gauge or as a capacitive sensor. Herein at least one part of the sensor, that is to say the strain gauge or a side/face of the capacitor is disposed on/at the rotor unit, and can in an advantageous manner (co-)generate the sensor signal and be transmitted to the stator unit by means of the transmission unit.

In one preferred variant of the present invention, the clamping force sensor is disposed on and/or in the stator unit. A transmission unit for transmitting the sensor signal or the measured data, respectively, from the rotating rotor unit to the static stator unit can be dispensed with herewith. This reduces the constructive and economic investment.

For example, at least one clamping force sensor/the clamping force sensors is/are configured as radar sensors, or as locating sensors based on electromagnetic waves. In advantageous embodiments of the present invention, at least one of the clamping force sensors is configured as an inductive and/or optical and/or magnetic sensor/Hall sensor and/or as an ultrasonic sensor. Respective sensors can be acquired as already commercially available and proven sensors and can be used or applied, respectively, according to the present invention. This improves the economy and the reliability of the detection.

For example, at least one of the clamping force sensors is configured as an axial sensor having at least one detection region that is aligned in the longitudinal direction, the clamping force sensor being preferably configured as a proximity sensor for detecting a spacing in the axial direction between the rotor unit and the stator unit. It has been demonstrated in the complex tests that the bracing or the axial activation of the tool clamping device or of the collet chuck, respectively, generates a (minor) axial deformation of the counter bearing/detent, or of the spindle shaft, respectively. This axially aligned compression of the counter bearing/detent, or of the spindle shaft, respectively, that is generated by the clamping force can be detected by the advantageous axial sensor. A spacing/air gap that is to be detected can be increased or decreased in size herein, depending on the arrangement/configuration of the axial sensor.

In one particular refinement of the present invention, the rotor unit is a protrusion that is aligned in the radial direction and/or has an arm that is aligned in the radial direction, and the axial sensor is aligned such that the protrusion and/or the arm lies in the detection region of the axial sensor, so as to detect a displacement of the rotor unit in the axial direction and/or to measure any tilting of the rotation axis.

A web or measuring arm, respectively, that is at least partially or substantially, respectively, radially aligned is preferably provided. The web or the measuring arm, respectively is configured as the aforementioned protrusion and/or arm, for example. An amplification or enhancement, respectively, of the sensitivity of the sensor system can in an advantageous manner be achieved on account of an advantageous length of the protrusion and/or of the web or the measuring arm, respectively. The protrusion and/or the web or the measuring arm, respectively, on account of a radial deformation of the rotor unit or of the tool receptacle unit, respectively, can be imparted an angular readjustment or modification of the alignment, respectively, in relation to the rotation axis, in particular, a modification of a radial or 90° alignment, respectively up to an alignment that deviates therefrom or in relation to the rotation axis is at an acute angle, respectively, such that an amplification or a multiplication, respectively of the deflection or of the originally rather radial deformation, respectively, is achieved, for example, by an advantageous detection of the location/position of the protrusion and/or of the web or the measuring arm, respectively, by one of the clamping force sensors or spacing sensors, respectively, on the end region or on the end of the protrusion, respectively, and/or of the web or measuring arm, respectively. The measuring sensitivity of the sensor system according to the present invention can be enhanced or improved, respectively, herewith.

In one particular refinement of the present invention, the clamping force sensor is configured as a radial sensor having at least one detection region which is aligned so as to be perpendicular to the longitudinal direction of the rotation axis. The radial deformation of the counter bearing/detent of the tool clamping device or of the collet chuck, respectively, and/or of the spindle shaft that is generated by the bracing or by the clamping force, respectively, can be detected herewith in an advantageous manner by the advantageous radial sensor. Specifically, an arrangement and/or a configuration of the clamping force sensor as a contactless and/or non-contacting radial sensor also guarantees a particularly advantageous detection of the deformation, and the generation and optionally the forwarding of advantageous sensor signals or measured data, respectively. A spacing/air gap to be detected between the rotor unit and the stator unit will be advantageously reduced in size herein. To this end, inductive sensors having at least one measuring coil, magnetic sensors having a magnetic or magnetizable, respectively, material/element, and/or optical sensors having an optical transmitter and/or receiver and/or reflector, for example, the deforming portion/surface of the rotor unit/tool clamping device/spindle shaft, are particularly advantageous. For example, visible light, laser light, UV or IR light, and/or an optical inferometer or the like can be used in order for the modification of the spacing to be detected, for example.

In general, with the aid of the clamping force sensor according to the present invention in the case of an impediment and/or a breakage and/or a contamination or disadvantageous modification, respectively of the tool clamping device, or of a clamping element, respectively, one single sensor can already be advantageous. For example, in the case of a breakage of one of the (six) clamping elements of a collet chuck during the machining or subtractive machining, respectively, of the tool, that is to say in the rotating operation or in the case of a rotating rotor unit/spindle shaft/motor spindle, respectively, this one sensor according to the present invention can thus already detect this modification/impediment. After all, on account of the modification/reduction, or the absence of the deformation according to the present invention, respectively, at the location of the one clamping segment, this fact becomes detectable at the latest at/upon one full rotation of the shaft/rotor unit.

Also, for example, a contamination of already one of the preferably six clamping segments/elements of a collet chuck or tool clamping device, respectively, can be detected even prior to the machining or subtractive machining, respectively, of the tool by way of a single clamping force sensor according to the invention. After all, a shaving or a dirt particle, respectively, which has been or is jammed, respectively, between the clamping element/segment and the spindle shaft/counter holder/detent can lead to a detectable modification of the deformation, in particular to a comparatively large or intense, respectively, material deformation at this particular location when starting up or at the latest upon a full revolution of the rotor unit/spindle shaft, for example. This fact can be detected and processed/used further according to the invention, for example, for controlling or regulating, respectively, and/or for decelerating/stopping the rotor unit/spindle shaft/motor spindle.

In general, advantageous signaling of a detected modification of the deformation, that is to say above all of a deviation of the detected actual deformation from the nominal deformation (to be expected) is be helpful to the operator of the machine tool. A signal mast and/or a display of a display/screen is preferably activated such that the attention of the operator is drawn to the modification or impediment, respectively, and the operator can attend to the fault or the modification, respectively, and remedy the latter. A significant improvement in terms of quality assurance or in terms of the avoidance of scrap is achieved therewith.

Determining and optionally displaying/identifying the respective clamping element/segment can be implemented by way of an advantageous rotary encoder or the like, for example.

Halting/decelerating or stopping, respectively, the rotor unit such that no inaccuracies or disadvantages, respectively, can arise in the machining of the workpiece, in particular, in terms of the accuracy of the latter, can preferably already be initiated (immediately or directly, respectively) upon/at/during the detection of a modification of the deformation and/or of a deviation in the detected actual deformation from a (stored/defined) nominal deformation by means of an electrical control or regulating unit, respectively.

At least two or a plurality of clamping sensors are advantageously disposed in the circumferential direction, in particular, at mutually dissimilar angular positions about the rotation axis and/or are disposed symmetrically about the rotation axis. The modification of the abovementioned deformations and moreover any vibration of the rotating rotor unit, in particular of the spindle shaft or the motor spindle, respectively, can be detected in an advantageous manner herewith. Halting/decelerating or stopping, respectively, the rotor unit such that no inaccuracies or disadvantages, respectively, can arise in the machining of the workpiece, in particular, in terms of the accuracy of the latter, can preferably already be initiated (immediately or directly, respectively) upon/at/during the detection of a modification of the vibrations of the rotating rotor unit, in particular of the spindle shaft or the motor spindle and/or of a deviation in the detected actual vibrations from (stored/defined) nominal vibrations by means of an electrical control or regulating unit, respectively.

The spindle shaft in terms of the diameter can be widened by approximately 5 μm, for example. To date, this fact has been problematic to some extent because this widening has taken place precisely in the region of a bearing. This widening or deformation, respectively, of the rotor unit or of the shaft, respectively, has arisen due to the clamping/drawing force of the tool. As soon as a tool is chucked in the shaft, the shaft is axially compressed in the front region, the shaft as a result thereof expanding in a radial manner.

The present invention relates to the detection of the elastic deformations of the components of a machining spindle that are located in the flux of force, the deformations being caused by the clamping force between the tool clamping system and the spindle shaft. It is advantageous herein that the deformations that are caused by virtue of the drawing force can also be measured when in operation, conclusions pertaining to the securely clamped tool thus also being able to be drawn in the operation of the spindle.

Conclusions pertaining to the uniformity of the clamping forces that are introduced in the gripper segments can also be drawn by way of a correspondingly pronounced radial asymmetry of the deformation of components.

Furthermore, dynamic measuring of the concentric running as a basis for the appraisal of the machining process in terms of vibration technology is possible by way of the arrangement of at least one second measuring possibility that is spaced apart in angular terms.

An elastic deformation of the geometry in the region of the flux of force takes place by virtue of the drawing force by way of which the tool is drawn into the receptacle of the spindle shaft. A conclusion pertaining to the amplitude of the drawing force with which the tool is drawn into the receptacle can be made based on this deformation. Substandard tensions and an inadequate drawing force as well as an excessive drawing force can thus be detected and evaluated in terms of measuring technology in the operation of the spindle.

A supervision of the bearing of the tool in the interface can also be implemented in an advantageous manner. In order for accurate geometries to be established on the workpiece by way of tools, it is important for the corresponding faces of the tool and of the tool receptacle in the spindle to bear on one another in a smooth manner. If this bearing is disturbed, for example, by a shaving being "jammed", the region in the direct flux of force is deformed in a manner that is non-uniform in comparison with the remaining regions. This non-uniform deformation can be detected and evaluated by way of the sensor system according to the present invention.

Monitoring of the machining process is advantageously implementable. The "trajectory" of the spindle shaft can be detected by way of the sensor systems that are spaced apart in an angular manner. Lissajou figures that are as uniform as possible and, in particular, narrow herein indicate a stable process with reproducible workpiece characteristics. "Chaotic" shapes indicate disturbed processes. Workpieces that are produced so as to have such parameters in most cases do not meet the specifications and are thus scrap.

BRIEF DESCRIPTION OF THE DRAWINGS

An exemplary embodiment of the present invention is illustrated in the drawing and will be explained in more detail hereunder by means of the figures.

DETAILED DESCRIPTION OF THE INVENTION

Figure 1:
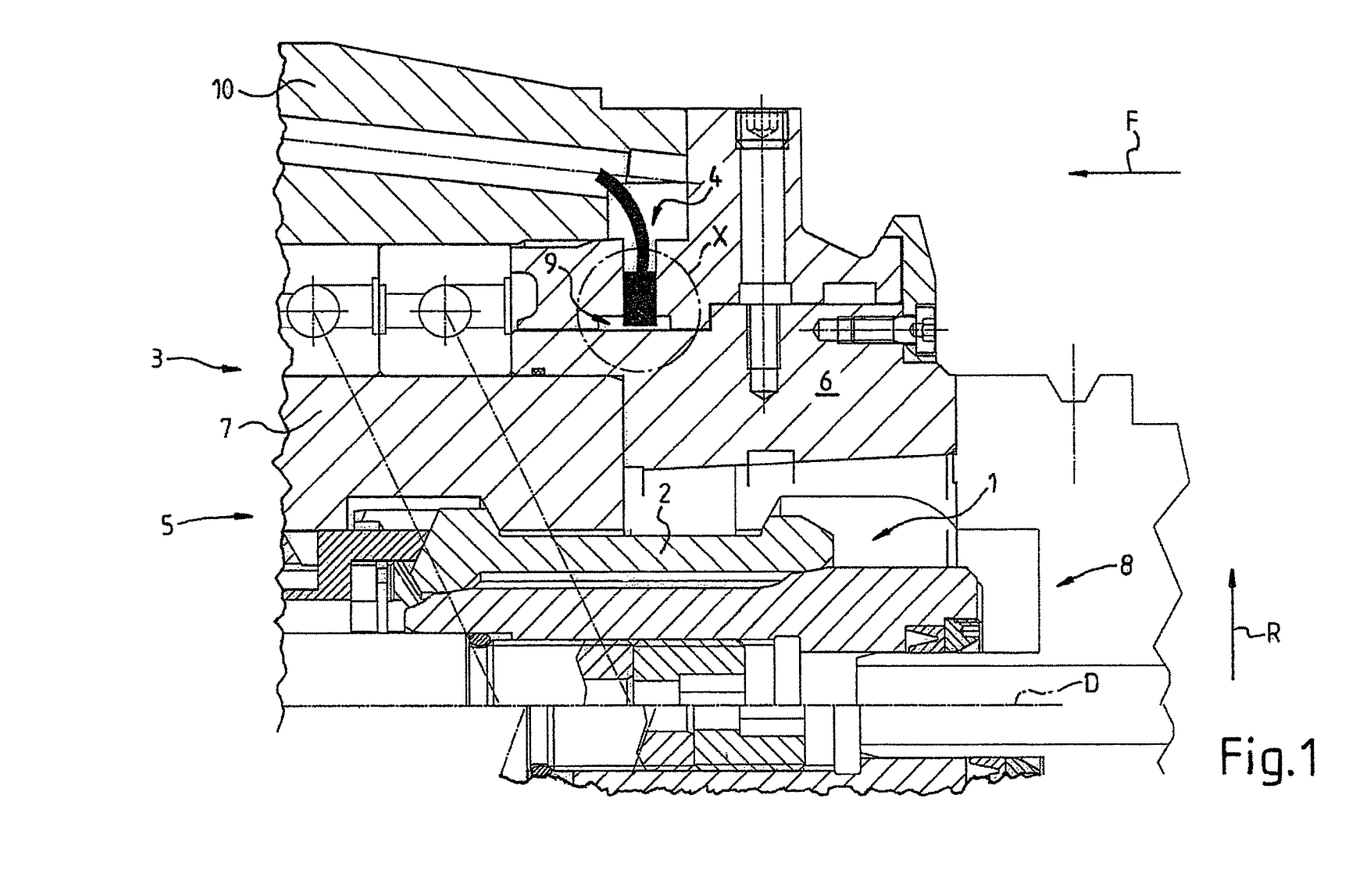
FIG. 1 shows a schematic sectional fragment of a motor spindle according to the present invention with a radial sensor.
Figure 2:
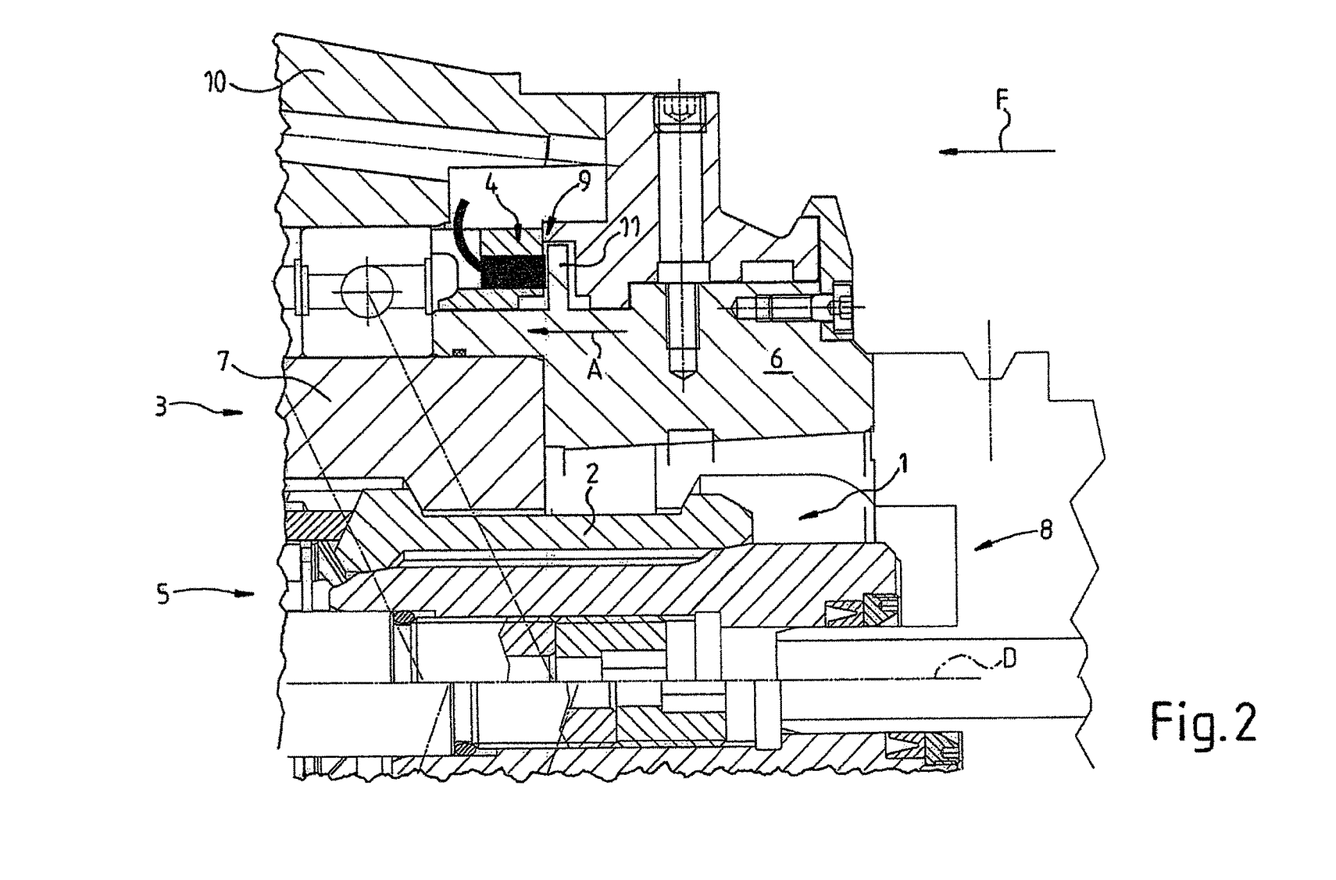
FIG. 2 shows a schematic sectional fragment of a motor spindle according to the present invention with an axial sensor.

A collet chuck 1 having a plurality of clamping segments 2 is illustrated schematically in a section in a motor spindle 3 of a machine tool in each of FIGS. 1 and 2. As is customary in machine tool engineering, one side of the collet chuck 1 is illustrated in the non-tensioned state (part almost not illustrated) and in the tensioned state of the motor spindle 3 or of the collet chuck 1, respectively.

A clamping force sensor 4 according to the present invention can be seen in the tensioned part of the motor spindle 3 illustrated in the figures. This sensor 4 in FIG. 1 has an effective region that is aligned in a radial manner, and in FIG. 2 has an effective region that is aligned to the rotation axis D. Accordingly, a radial sensor 4 in the context of the present invention is illustrated in FIG. 1, and an axial sensor 4 in the context of the present invention is illustrated in FIG. 2. However, a second corresponding sensor 4 according to the present invention cannot be seen in each case in either of FIGS. 1 and 2, since the second sensor 4 is in each case disposed so as to be offset, in particular by 90°, in the circumferential direction and is thus invisible in the sectional illustrations. The arrangement of the two sensors 4 according to the present invention can be seen in FIG. 3.

A region X, illustrated schematically in FIG. 1, of a spindle shaft 5, or of a counter holder 6, respectively or of a detent/ring element 6, respectively, of the motor spindle 3 is deformed or widened, respectively, in the radial direction R on account of the bracing of the tool (not illustrated in more detail), or on account of a readjustment of the collet chuck 1 or of the clamping segments 2, respectively, that is directed axially in the direction of the rotation axis D. An element 7 of the spindle shaft 5 herein transmits a clamping force F, or a deformation/modification of a tool receptacle unit 8 to the element 6. A spacing 9, or an air gap 9, respectively, between the rotor unit or the spindle shaft 5, respectively, and a stator unit 10 having the radial sensor 4 is modified or reduced in size, respectively, on account thereof. The modification of the deformation in the region X on account of the bracing is the nominal deformation in the context of the present invention, and a modification of the detected actual deformation is accordingly used in an advantageous manner for regulating/controlling the motor spindle 3.

An axially aligned deformation of a measuring arm 11, or an axial modification A of the spacing 9, respectively in FIG. 2 is detectable and further processable by way of the axial sensor 4. This axial modification A is in turn generated by a clamping force F or by a radial deformation/modification of the tool receptacle unit 8, respectively, acting on the element 6.

Figure 3:
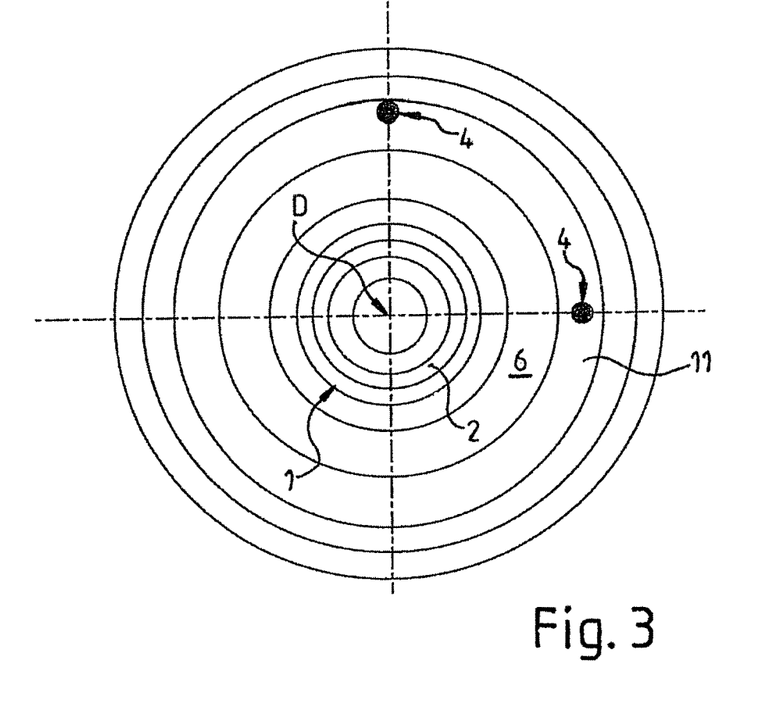
FIG. 3 shows a schematic cross section in the direction of the rotation axis of the motor spindle according to FIG. 2, with two axial sensors according to the present invention.

A cross section through the variant according to FIG. 2 is illustrated in a highly schematic manner in FIG. 3, wherein the advantageous arrangement of the two sensors 4 according to the present invention is highlighted. These two sensors 4, like two radially oriented sensors 4 (also not illustrated in more detail) according to FIG. 1 are disposed so as to be offset by preferably 90° in the circumferential direction. The exact position/alignment of the rotation axis D can be detected or determined, respectively, in an advantageous manner herewith. Symmetrical or non-symmetrical deformations/modifications of the counter holder 6, or of the detent/ring element 6, respectively, of the motor spindle 3 and/or of the tool receptacle unit 8 can be detected and be appraised/evaluated in an advantageous manner by the two sensors 4.

The invention claimed is:

1. A motor-driven machine-tool unit comprising a stator unit, a rotor unit that is rotatable about at least one rotation axis, wherein the rotor unit comprises at least one tool receptacle unit having a tool clamping device that is adjustable in a longitudinal direction of the at least one rotation axis and impingeable with a clamping force for fixing and bracing a releasably fixable tool, and one single clamping force sensor for detecting bracing of the tool clamping device,
wherein, in order for the position and/or the alignment of the at least one rotation axis to be determined in a machining procedure of the motor driven machine tool the one single clamping force sensor is:
(i) configured as a proximity sensor for detecting a spacing between the rotor unit and the stator unit,
(ii) configured as a deformation sensor for detecting a deformation of at least part of the rotor unit and/or of the at least one tool receptacle unit that is detected upon one full rotation of the rotor unit, and
(iii) configured to signal a detected deviation of a detected actual deformation from a nominal deformation.

2. The motor-driven machine-tool unit as claimed in claim 1, wherein the one single clamping force sensor is configured as a radial sensor having a detection region which is aligned so as to be perpendicular to the longitudinal direction of the at least one rotation axis.

3. The motor-driven machine-tool unit as claimed in claim 2, wherein the rotation axis is disposed in the detection region of the one single clamping force sensor.

4. The motor-driven machine-tool unit as claimed in claim 1, wherein the one single clamping force sensor is provided as an axial sensor having a detection region that is aligned in the longitudinal direction of the at least one rotation axis.

5. The motor-driven machine-tool unit as claimed in claim 1, wherein the rotor unit has a protrusion that is aligned in a radial direction, and/or an arm that is aligned in the radial direction, and an axial sensor is aligned such that the protrusion and/or the arm is in a detection region of the axial sensor, so as to detect a displacement of the rotor unit in an axial direction, and/or to measure any tilting of the rotation axis.

6. The motor-driven machine-tool unit as claimed in claim 1, wherein the one single clamping force sensor is disposed in a direction of the rotation axis in the region of the tool clamping device and/or of the at least one tool receptacle unit.

7. The motor-driven machine-tool unit as claimed in claim 1, wherein the one single clamping force sensor is disposed on and/or in the stator unit.

8. The motor-driven machine-tool unit as claimed in claim 1, wherein the one single clamping force sensor is disposed on and/or in the rotor unit and comprises a transmission unit for transmitting measured data.

9. The motor-driven machine-tool unit as claimed in claim 1, wherein the one single clamping force sensor is configured as an inductive and/or as an optical and/or as a magnetic sensor, and/or as an ultrasonic sensor.

10. A machine tool having a motor-driven machine-tool unit as claimed in claim 1.

11. The motor-driven machine-tool unit as claimed in claim 1, wherein the unit is a multi-axis turning head or a motor spindle.

12. The motor-driven machine-tool unit as claimed in claim 1, wherein the one single clamping force sensor detects the clamping force that is caused in the fixing and bracing.

13. The motor-driven machine-tool unit as claimed in claim 1, wherein the one single clamping force sensor measures the clamping force across the deformation of the at least part of the rotor unit that runs symmetrically about the rotation axis and is caused by the action of the clamping force.

* * * * *